United States Patent
Yamamoto

[11] Patent Number: 5,811,956
[45] Date of Patent: Sep. 22, 1998

[54] APPARATUS AND METHOD FOR CONTROLLING TORQUE OF INDUCTION MOTOR THROUGH VECTOR CONTROL TYPE INVERTER

[75] Inventor: Yasuhiro Yamamoto, Ichinomiya, Japan

[73] Assignee: Kabushiki Kaisha Meidensha, Tokyo, Japan

[21] Appl. No.: 800,171

[22] Filed: Feb. 13, 1997

[30] Foreign Application Priority Data

Feb. 15, 1996 [JP] Japan .................................. 8-027477

[51] Int. Cl.⁶ .................................................. H02P 21/00
[52] U.S. Cl. ........................... 318/801; 318/805; 318/812
[58] Field of Search .................................. 318/798–805, 318/807, 810, 811, 812, 814

[56] References Cited

U.S. PATENT DOCUMENTS

| | | | |
|---|---|---|---|
| 4,862,054 | 8/1989 | Schauder ................................. | 318/800 |
| 4,885,518 | 12/1989 | Schauder ................................. | 318/798 |
| 4,885,520 | 12/1989 | Sugimoto et al. ....................... | 318/808 |
| 4,962,339 | 10/1990 | Schauder ................................. | 318/798 |
| 5,155,797 | 10/1992 | Nomura et al. ..................... | 318/801 X |
| 5,341,081 | 8/1994 | Yamada ................................. | 318/800 |
| 5,481,173 | 1/1996 | Yamamoto ............................. | 318/801 |

FOREIGN PATENT DOCUMENTS 0 490 024  6/1992  European Pat. Off. .

OTHER PUBLICATIONS

M. Akbaba, et al., "Improved estimation of induction machine parameters", *Electric Power Systems Research*, vol. 34, pp. 65–73, 1995.

Patent Abstract of JP 01 209980, Iwata Kazutoshi, Toshiba Corporation, "Secondary Circuit Constant Arithmetic Device", Aug. 23, 1989.

Patent Abstract of JP 06 153568, Mizuno Takayuki, Meidensha Corporation, "Method for Measuring Constant of Induction Motor", May 31, 1994.

T.J. White, et al., "Improved Dynamic Performance of the 3–Phase Induction Motor Using Equivalent Circuit Parameter Correction", *IEE Control '94*, pp. 1210–1214, 1994.

Patent Abstract of JP 06 086581, Yamada Tetsuo, et al., Meidensha Corporation, "Compensating Method for Fluctuation in Parameter", Mar. 25, 1994.

*Primary Examiner*—Bentsu Ro
*Attorney, Agent, or Firm*—Foley & Lardner

[57] ABSTRACT

In apparatus and method for controlling a torque of an induction motor through a vector control method type inverter having a slip frequency calculator arranged for calculating a slip frequency used to perform a vector control for the induction motor and a secondary resistance compensation circuit arranged for correcting the slip frequency by a temperature variation in a secondary resistance of the induction motor, basically a skin effect correction circuit is added for deriving an error component developed in an output of the secondary resistance compensation circuit when a leakage inductance $L\sigma$is non-linearly varied due to a skin effect phenomenon.

13 Claims, 6 Drawing Sheets

T TYPE

T-I TYPE

APPARATUS AND METHOD FOR CONTROLLING TORQUE OF INDUCTION MOTOR THROUGH VECTOR CONTROL TYPE INVERTER

BACKGROUND OF THE INVENTION:

The present invention relates to apparatus and method for controlling a torque of an induction motor through a vector control type inverter, especially relates to the apparatus and method therefor designed in order to compensate for circuit constants of the induction motor in the torque control.

A vector control system is generally used in a variable speed and drive apparatus for an induction motor in which a magnetic flux component and a current component of a secondary circuit (circuit in a rotor side of the induction motor) are controlled in terms of a noninterference mode so as to control accurately generated torque and magnetic flux in the induction motor.

The vector control system is widely used even in a control system such as a servo system in which a favorable response characteristic is required since it can accurately control a transient torque variation as well as a steady torque.

Anyway, circuit constants of the induction motor which is a controlled object for the vector control are required to perform the vector control. However, actual circuit constants do not strictly coincide with designed values of the circuit constants and errors are present in the circuit constants of the designed values. In addition, deviations in the circuit constants for individual induction motors are strictly present due to mechanical working accuracies and material characteristics used in the individual induction motors.

Furthermore, non-linear characteristics such that the circuit constants are varied depending on driving conditions of the induction motor are found in every induction motor.

Since the induction motor under the vector control has been used in such a situation that a torque control accuracy is not strictly required, it has been necessary to strictly handle the circuit constants with their non-linear characteristics taken into consideration. The non-liner characteristics such as a magnetic saturation in an iron (copper) core of the induction motor and a temperature variation in a secondary resistance give remarkable effects on a characteristic of the whole induction motor. Therefore, the vector control system for the induction motor has carried out a compensation for these non-linear characteristics.

A U.S. Pat. No. 5,341,081 exemplifies a compensation method for compensating for the non-linear characteristics described above.

Consequently, the torque control accuracy has been improved up to about 3%. However, a room for the further improvement is left in order to meet the requirement of the torque control accuracy up to, e.g., about 1 t (for example, a chassis dynamometer application).

A Japanese Patent Application First Publication (not examined) No. Heisei 6-86581 published on Mar. 25, 1994 exemplifies a previously proposed vector control apparatus for the (three-phase) induction motor.

In the previously proposed vector control apparatus for the induction motor disclosed in the above-identified Japanese Patent Application Publication, a variation in a secondary resistance which is one of the circuit constants depending on its temperature variation is compensated.

In details, the previously proposed vector control apparatus disclosed in the above-identified Japanese Patent Application Publication includes:

1) an induced voltage and magnetic flux calculating circuit arranged for subtracting voltage drop components across a primary resistance RI and across a leakage inductance (Lσ) due to an output current component or current instruction component from an output voltage information of the induction motor to calculate a secondary induced voltage $E_2$ ($E_{2d}$, $E_{2q}$) or calculate a secondary magnetic flux $\lambda_2$($\lambda_{2d}$, $\lambda_{2q}$) of its integration of $E_2$;

2) a model calculating circuit arranged having a equivalent mathematical model and arranged for calculating and outputting a secondary induced voltage ($E_{2d}^*$, $E_{2d}^*$) of the model from a magnetic flux instruction $\lambda_{2d}^*$, a torque current instruction IT*, and an output frequency $\omega_1$;

3) an error characteristic variable extracting circuit arranged for comparing both outputs of the induced voltage and magnetic flux calculating circuit and model calculating circuit to determine whether an error between the respective outputs occurs, and extracting and outputting a component corresponding to an error component in $R_2'$ used to calculate a slip frequency to a secondary resistance compensation circuit when determining that an error between the secondary resistance in the model and that in the actual induction motor is present in a case where the error between the respective outputs is present;

4) the secondary resistance compensation calculation circuit arranged for integrating the component corresponding to the error component of the secondary resistance $R_2'$ outputted from the error characteristic variable detector, providing a limit for the integrated component to calculate a temperature variation coefficient KR2 of the secondary resistance $R_2'$; and 5) the slip calculation circuit arranged for multiplying the component of $R_2'$ in a slip calculation by the coefficient KR2 to calculate the slip corresponding to the variation in the secondary resistance of the actual induction motor.

Therefore, the previously proposed vector control apparatus disclosed in the above-identified Japanese Patent Application Publication can calculate an optimum slip estimating the variation in the secondary resistance even when the secondary resistance in the actual induction motor is varied depending on its temperature variation during the driving of the motor and can achieve an accurate torque control performance.

It is noted that an input of the error characteristic variable extracting circuit generally includes two axes voltage and current components of d axis and q axis and an output thereof is a one-dimensional data such as to reduce or increase the value of the secondary resistance $R_2$.

In the previously proposed vector control apparatus, an axis along the primary current of the induction motor is newly set as λ axis and an axis orthogonal to the λ axis is newly set as σ axis so that the σ axis of the error voltage component is extracted and outputted to the secondary resistance compensation circuit.

In this way, differences in the various secondary resistance compensation methods are present depending on whether the input of the extracting circuit is the voltage component or magnetic flux component and depending on which component is extracted from the two-axes data and outputted in the form of the one-dimensional data.

However, the previously proposed vector control apparatus disclosed in the above-identified Japanese Patent Application Publication has the following problems to be solved although the vector control apparatus described above is effectively operated in a case where only the secondary resistance component is varied and under a prerequisite such that there are no variation in the circuit constants including the leakage inductance (Lσ) other than the secondary resistance component.

Actually, however, such a phenomenon as a skin effect related to a slot formation on the rotor of the actual induction motor occurs and the skin effect causes the slip frequency to vary the circuit constants in the secondary side (such as $R_2$ and l2 in FIG. 5 or $R_2'$, L σ, and M' in FIG. 6).

Although the variation in the secondary resistance component can be compensated by the previously proposed vector control apparatus described above and although the circuit constant of the leakage inductance Lσ is used in the induced voltage and magnetic flux calculating circuit and the model calculating circuit, the secondary resistance compensation circuit cannot compensate for the variation in the leakage inductance Lσ.

In other words, even if the secondary resistance compensation circuit is applied to the previously proposed vector control apparatus, a secondary resistance compensation characteristic itself is varied according to a variation of an applied load to the induction motor in a case of the induction motor on which a large effect of the skin effect gives.

An accuracy of the secondary resistance compensation is determined how the variation in the leakage inductance Lσ due to the skin effect is modeled and how 6 accurate the variation therein is compensated. This is the first problem to be solved.

Next, suppose that the non-linearity in the leakage inductance Lσ can accurately be measured and the accurate leakage inductance Lσ can be used in the model calculating circuit. At this time, since the secondary resistance compensation can accurately be operated, the more accurate torque control performance than the previously proposed vector control apparatus could be achieved even if the variations in the load and in the temperature of the secondary resistance occur.

However, it is noted that in a case where the load is abruptly varied, the secondary resistance is abruptly varied as well as the leakage inductance in the actual induction motor due to its skin effect. In this situation, it takes a lot of time to estimate and calculate the compensation itself for the secondary resistance so that a delay time occurs until a real value of the secondary resistance is estimated. In addition, a transient torque control error occurs due to a follow-up lag of the secondary resistance compensation immediately after the load abrupt change.

In a case where a response of the secondary resistance compensation is slower than a secondary time constant, this is effected not only on a merely torque error but also a variation in the secondary magnetic flux so that the torque error is continued for a time duration to occur until the magnetic flux is returned to the original even when the secondary resistance compensation estimation is ended. Such a transient torque error during the occurrence of the abrupt change in the load needs to be suppressed. This is the second problem to be solved.

SUMMARY OF THE INVENION:

It is, therefore, an object of the present invention to provide apparatus and method for controlling a torque of an induction motor through a vector control type inverter which can solve the above-described problems and which have improved torque control accuracy with non-liner characteristics of circuit constants in the induction motor taken into consideration.

According to one aspect of the present invention, there is provided with an apparatus for controlling a torque of an induction motor through a vector control method type inverter, comprising:

a) a detector arranged for detecting a velocity ωr of a rotor of the induction motor;

b) an output frequency calculator arranged for calculating an output frequency $ω_1$ of the induction motor from the detected rotor velocity ωr;

c) a model calculator having a model equivalent to the induction motor and arranged for calculating at least a secondary induced voltage $E_2^*$ of the model from a torque current instruction IT*, a secondary magnetic flux instruction $λ_{2d}^*$, and the output frequency $ω_1$;

d) an induced voltage and magnetic flux calculator arranged for calculating at least a secondary induced voltage $E_2$ from a primary voltage and current of the induction motor;

e) an error characteristic variable extracting circuit arranged for deriving a deviation between the calculated secondary induced voltages by said induced voltage and magnetic flux calculator and said model calculator and extracting and outputting an error characteristic variable corresponding to a variation in a secondary resistance of the induction motor from the deviation therebetween as a one-dimensional component;

8 f) a slip calculator arranged for calculating a slip frequency ωs from the secondary magnetic instruction $λ_{2d}^*$, the torque current instruction IT*, and the secondary resistance $R_2'$ of the induction motor; and g) a compensation circuit arranged for correcting the slip frequency calculation of said slip calculator used to perform a vector control for the induction motor by a temperature variation in the secondary resistance of the induction motor according to an output variable of said error characteristic variable extracting circuit, wherein said apparatus further comprises a skin effect correction circuit having a non-linear function table and arranged for deriving an error component developed in an output of said compensation circuit when a leakage inductance of the induction motor is non-liearly varied due to a skin effect from the non-linear function table corresponding to the detected velocity CO r of the rotor of the induction motor and at least either of the torque current instruction IT* or torque instruction Trq and an adder arranged for adding the outputted error component of said skin effect correction circuit to the output variable of said error characteristic variable extracting circuit.

According to another aspect of the present invention, there is provided with a method for controlling a torque of an induction motor through a vector control method type inverter, said method comprising the steps of:

a) detecting a velocity ωr of a rotor of the induction motor;

b) calculating an output frequency $ω_1$ of the induction motor from the detected rotor velocity ωr;

c) providing a model equivalent to the induction motor and calculating at least a secondary induced voltage $E_2^*$ of the model from a torque current instruction IT*, a secondary magnetic flux instruction $λ_{2d}^*$, and the output frequency $ω_1$;

d) calculating at least a secondary induced voltage $E_2$ from a primary voltage and current of the induction motor;

e) deriving a deviation between the calculated secondary induced voltages at the step d) and step c) and extracting and outputting an error characteristic variable corresponding to a variation in a secondary resistance of the induction motor from the deviation therebetween as a one-dimensional component;

f) calculating a slip frequency CO s from the secondary magnetic instruction $\lambda_{2d}^*$, the torque current instruction IT*, and the secondary resistance $R_2'$ of the induction motor; and g) correcting the slip frequency calculation used to perform a vector control for the induction motor by a temperature variation in the secondary resistance of the induction motor according to an output variable at the step e), wherein said method further comprises the steps of: h) providing a non-linear function table; i) deriving an error component developed in an output of said compensation circuit when a leakage inductance of the induction motor is non-linearly varied due to a skin effect from the non-linear function table corresponding to the detected velocity ωr of the rotor of the induction motor and at least either of the torque current instruction IT* or torque instruction Trq; and j) adding the outputted error component to the output variable outputted at the step e).

BEST MODE FOR CARRYING OUT THE INVENTION:

Reference will hereinafter be made to the drawings in order to facilitate a better understanding of the present invention.

Before explaining a first preferred embodiment of an apparatus for controlling a torque of an induction motor through a vector control type inverter according to the present invention, a definition of circuit constants in the induction motor (three-phase) will be described with reference to FIGS. 5 and 6.

Figure 5:
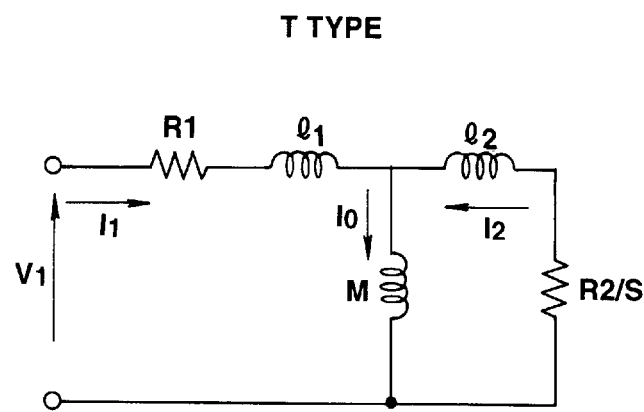
FIG. 5 is a T-type equivalent circuit diagram of an induction motor to which the apparatus for controlling the torque of the induction motor is applicable.

Conventionally, a T-type equivalent circuit of FIG. 5 has been used. However, since, in the vector control, variables such as an exciting current and torque current are used, a T-I type equivalent circuit of FIG. 6 is recently used which physically corresponds to these variables.

Figure 6:
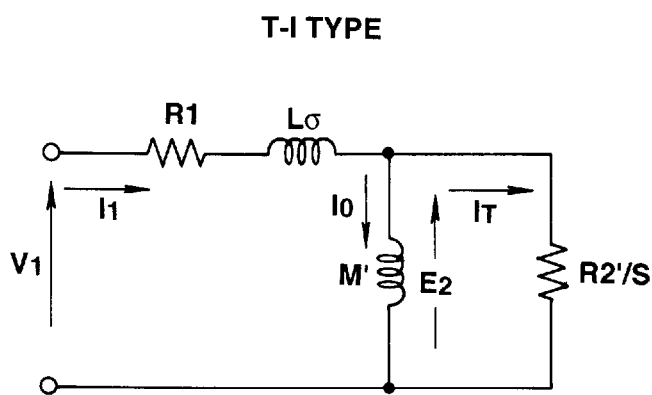
FIG. 6 is a T-I type equivalent circuit diagram of the induction motor to which the apparatus for controlling the torque of the induction motor is applicable.

Therefore, the torque controlling apparatus according to the present invention adopts the circuit constants in the T-I type equivalent circuit in FIG. 6.

It is noted that the circuit constants recited in FIG. 5 have been used in the problems to be solved described in the BACKGROUND OF THE INVENTION.

These two equivalent circuits of FIGS. 5 and 6 are transformed equivalently using a technique of tensor transformation. The relationship in these symbols is derived as shown in an equation (1).

$$M'=(M)^2/(M+l_2),$$

$$L\sigma=(M+l_1)-M',$$

$$R_2'=R_2\times\{(M/(M+l_2))\} \qquad (1)$$

In the equation (1), $R_2$ denotes a fixed secondary resistance, M denotes an exciting inductance, $l_1$ denotes a primary leakage inductance in Fig.5, $l_2$ denotes a secondary leakage inductance in FIG. 5, and Lσ denotes the leakage inductance in FIG. 6.

Figure 7:
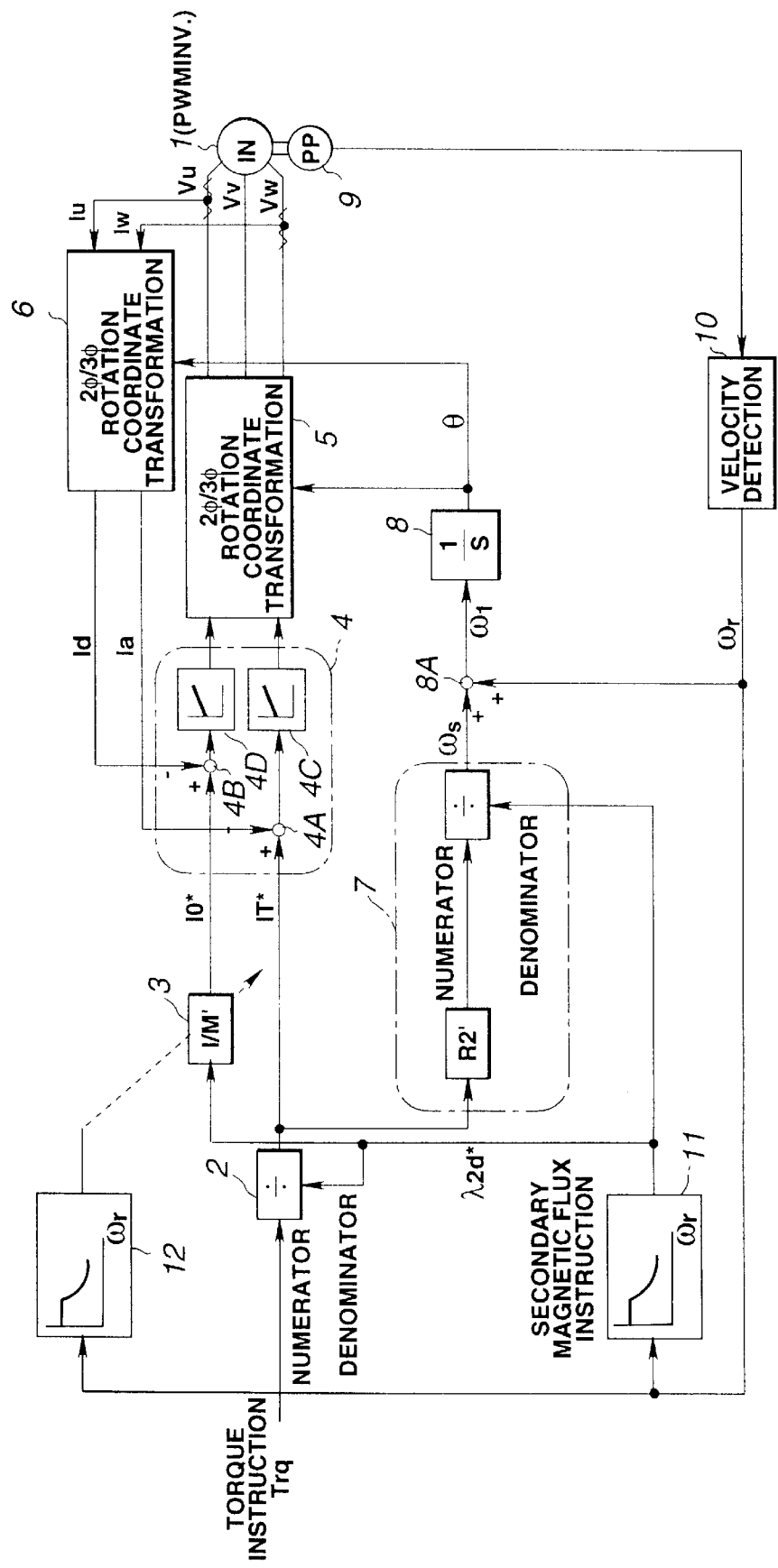
FIG. 7 is a circuit block diagram of a basic vector control apparatus for the induction motor.

Next, FIG. 7 shows a basic vector control of a slip frequency type on the basis of which the torque controlling apparatus according to the present invention is established.

In FIG. 7, a torque instruction Trq from a speed control system of the induction motor 1 is divided by a secondary magnetic instruction $\lambda_{2d}^*$ at a divider 2 to derive a torque instruction IT*. An exciting current instruction I0* is derived by multiplying and dividing the secondary magnetic flux instruction $\lambda_{2d}^*$ at a coefficient processor 3. These instructions I0* and IT* are compared with detected values Id and Iq of an exciting axis (d) 12 current component and a torque axis (q) current component, both components being orthogonal bi-phase rotational coordinate system rotating in synchronization with a power supply frequency, respectively, to derive their deviations at respective subtractors in a current control (ACR) system 4.

In the current control system 4, the deviations are respectively under proportional-integral (P-I) calculations to derive voltage instructions $V_{1d}$ and $V_{1q}$ on an orthogonal bi-phase rotational coordinate system.

A coordinate transformation circuit 5 transforms the bi-phase voltage instruction Vld and Vlq into tri-phase voltages Vu, Vv, and Vw on a three-phase fixed coordinate system through a bi-phase/tri-phase and rotational coordinate transformation to derive a primary voltage instruction to the induction motor 1. The primary voltage instruction is used as an output instruction of a PWM (Pulse Width Modulation) inverter (not shown) on the three-phase fixed coordinate system into currents Id and Iq on the bi-phase rotational coordinate system through a tri-phase/bi-phase and rotational coordinate system.

A slip calculator 7 calculates a slip frequency component ωs from the secondary magnetic flux instruction λ2d*, the torque current instruction IT*, and the secondary resistance $R_2$ of the induction motor 1.

A reference phase calculator 8 adds a rotor speed detection value ωr of the motor 1 to the slip frequency component ωs to derive a power supply angular frequency ω1 and integrates the value of ω1 through 1/s to derive a reference phase (exciting axis phase) θ1 and to develop a reference phase θ1 required to the coordinate transformations at the circuits 5 and 6. It is noted that the rotor speed of the induction motor 1 is detected by a phase pick up 9 axially coupled to the induction motor 1 to derive a pulse train having a frequency proportional to the rotation speed of the rotor and by a speed detector 10 which receives the pulse train from the pick up 9 to detect the rotor speed ωr. It is noted that s denotes a complex variable in the Laplace transform.

A secondary magnetic flux calculator 11 derives the secondary magnetic flux λ2d* from the rotor speed ωr. An exciting inductance saturation correction circuit 12 corrects the coefficient M' in the coefficient processor 3 according to the rotor speed ωr or magnetic flux instruction.

Figure 3:
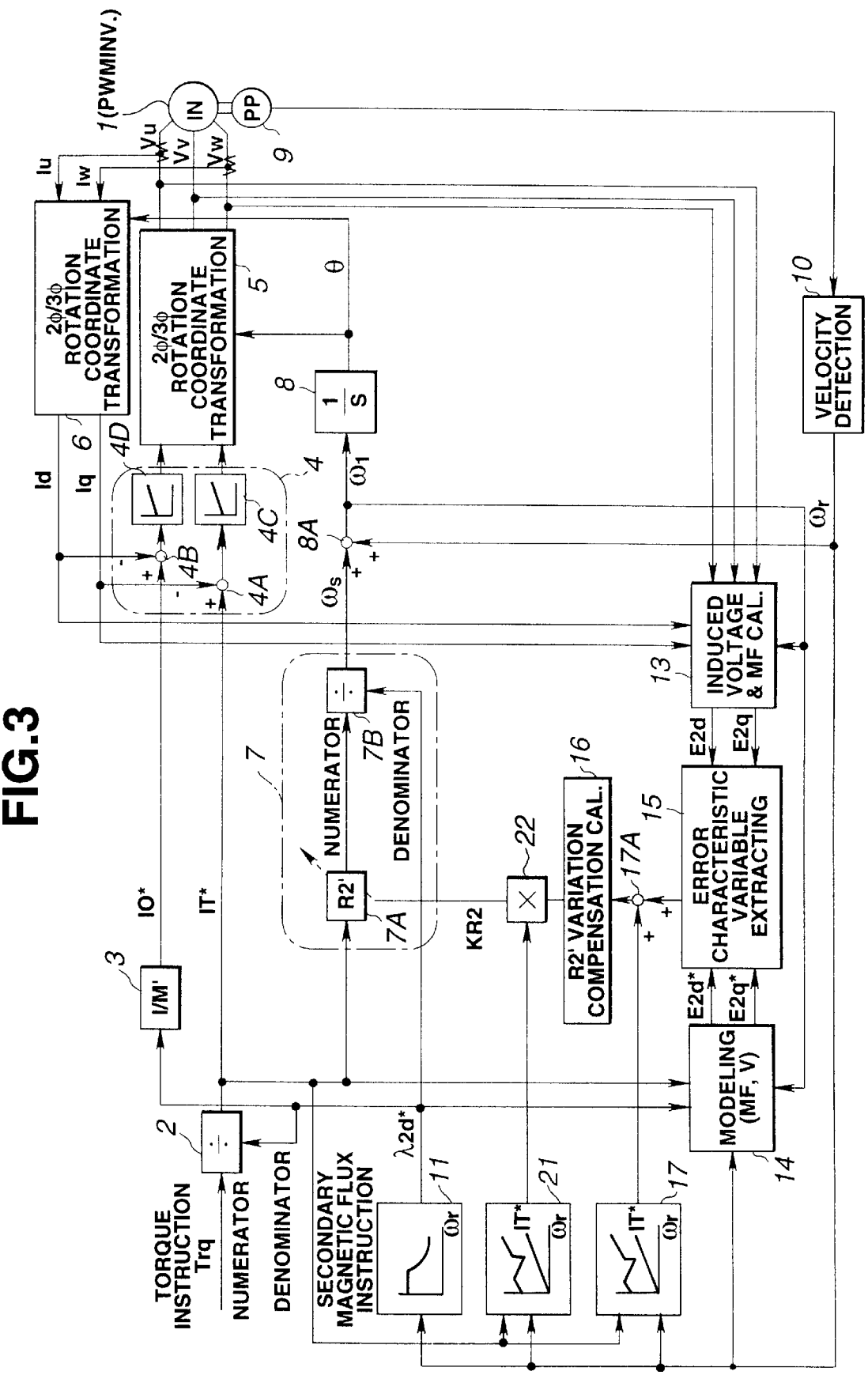
FIG. 3 is a circuit block diagram of the induction motor torque controlling apparatus in a third preferred embodiment according to the present invention.

In the vector control shown in FIG. 3, the magnetic flux instruction (exciting current component) and torque current component are given to control the torque of the induction motor 1 which correspond to field current and armature current of a DC motor and the slip calculator 7 calculates and controls the slip using the secondary resistance $R_2'$ of the induction motor 1.

Unless the slip is appropriately controlled, an accurate exciting current and torque cannot be developed so that a torque control error occurs. However, since each of current paths in the induction motor is constituted by an electrical conductor such as a copper (Cu) or aluminium (Al), the secondary resistance component is varied as the temperature thereof is varied during the driving. Hence, when a fixed secondary time constant is used in the slip calculation of the slip control, an accurate torque control cannot be achieved.

(First Embodiment)

Figure 1:
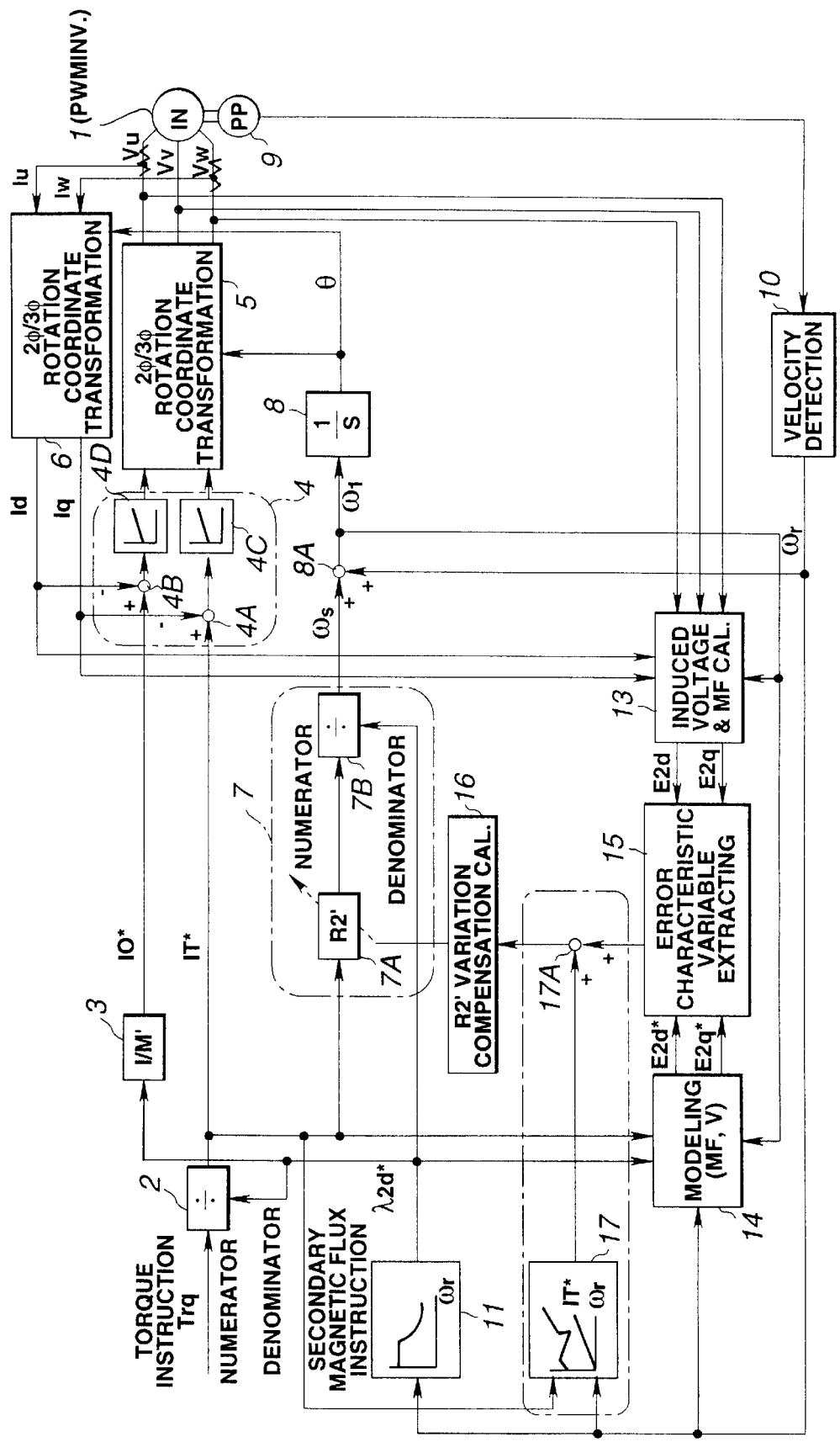
FIG. 1 is a circuit block diagram of an apparatus for controlling a torque of an induction motor in a first preferred embodiment according to the present invention.

FIG. 1 shows a circuit block diagram of the apparatus for controlling the torque of the induction motor through the vector control type inverter in a first preferred embodiment according to the present invention.

In FIG. 1, since the same reference numerals as those in FIG. 7 correspond to the like elements as in FIG. 7, the detailed description thereof will be omitted herein.

In the first embodiment, new circuits of a model calculator 14, an error characteristic variable extracting circuit 15, an induced voltage and magnetic flux calculating circuit 13, a secondary resistance variation compensation calculating circuit 16, a skin effect correction circuit 17, and a summer (adder) 17A are provided in the vector control system shown in Fig.7.

That is to say, the induced voltage and magnetic flux calculating circuit 13 subtracts the voltage drop components across the primary resistance $R_1$ and the leakage inductance $L\sigma$ caused by the output currents (Iu, Iw) or current instructions (Id, Iq) from the output voltage information (Vu, Vv, Vw) to derive the secondary induced voltage $E_2$ ($E_{2d}$, $E_{2q}$) or to derive the secondary magnetic flux $\lambda_2$ ($\lambda_{2d}$, $\lambda_{2q}$) of the integration of the secondary induced voltage $E_2$.

The model calculator 14 has the model in it and arranged for calculating and outputting the secondary induced voltage $E_2^*$ ($E_{2d}^*$, $E_{2q}^*$) (and further calculates the secondary magnetic flux $\lambda_2^*$ ($\lambda_2 d^*$, $\lambda_2 q^*$) of the model) of the model from the magnetic flux instruction $\lambda_{2d}^*$, the torque current instruction IT*, and output frequency $\omega$ 1 of the summer 8A before the slip calculator 8.

The error characteristic variable extracting circuit 15 compares both outputs of the induced voltage and magnetic flux calculation circuit 13 and the model calculator 14 and extracts and outputs the component corresponding to the error component of the secondary resistance $R_2'$ to the secondary resistance compensation circuit 16 so as to enable the correction of the secondary resistance $R_2'$ used for the slip calculation. The secondary resistance circuit 16 multiplies the $R_2'$ component in the slip calculator 7 so as to calculate the slip corresponding to the variation in the secondary resistance in the actual induction motor 1. These explanations of the circuits 13, 14, 15, and 16 have been made in the BACKGROUND OF THE INVENTION.

As described in the first problem to be solved of the BACKGROUND OF THE INVENTION, since the non-linearity of the leakage inductance $L\sigma$ provides a cause of the error in the compensation for the temperature variation of the secondary resistance, it is necessary to accurately model the non-linearity of the leakage inductance $L\sigma$. That is to say, a concept of the first embodiment is such that the leakage inductance $L\sigma$ at the model calculator side is accurately corrected so that the calculated voltage (or magnetic flux) at the model calculator side is made equal to that calculated at the secondary induced voltage and magnetic flux calculation circuit side. To achieve this concept, it is necessary to take an actual test with a load torque applied to the motor 1 using a load facility and to measure voltage and current of the motor 1 to derive the actual leakage inductance component.

In the first embodiment, since the non-linearity needs not to be handled in the form of $L\sigma$ unless the model voltage is used in that other than the compensation for the secondary resistance variation, the non-linear component to be naturally handled as the inductance is corrected as the error component (in a unit of error voltage or error magnetic flux) between those of the model calculator 14 and the secondary induced voltage and magnetic flux calculation circuit 13 which is outputted from the error characteristic variable extracting circuit 15.

If the leakage inductance $L\sigma$ were actually measured, it would be necessary to subtract an angular frequency and/or current value from the error between the output variable (voltage) from the model calculator 14 and the actual output variable (voltage) of the induced voltage and magnetic flux calculation circuit 13 (, i.e., the induction motor 1) in order to derive the variation in the leakage inductance $L\sigma$. However, when a method of adding the correction of the error component to the output of the error characteristic variable extracting circuit 15 is used in the first embodiment, data in the form of the voltage error component (or magnetic flux error component) may be saved so that a tuning during an actual load test in a second preferred embodiment to be described later can be simplified. In addition, it is not necessary to multiply the value of $L\sigma$ by a current and angular velocity during the compensation for the error due to the variation in the secondary resistance. Thus, the calculation of the variation in the leakage inductance L a can be simplified.

In the first embodiment, a skin effect correction circuit 17 is added which stores two-dimensional nonlinear function and an adder 17A is interposed between the output of the error characteristic variable extracting circuit 15, the skin effect correction circuit 17, and R2' variation compensation circuit 16.

The skin effect correction circuit 17 receives the detected value of the rotor speed $\omega r$ from the velocity (speed) detection circuit 10 and the torque current instruction IT* and outputs the component having the same unit (voltage or magnetic flux) as the output (variable) of the error characteristic variable extracting circuit 17 15. In the actual calculation of the non-linear function (table) in the skin effect correction circuit, with the input variables (IT* and $\omega r$) used in two lateral axes components, an interpolation of the table or approximation of the function is carried out. Then, the adder 17A adds the correction component of the skin effect correction circuit 17 to the output variable of the error characteristic variable extracting circuit 15.

Therefore, in a case where the error is generated in the secondary resistance compensation circuit due to the fact that parameters in the model do not coincide with corresponding parameters in the actual induction motor 1, the correction component derived from the skin effect correction circuit 17 can cancel the error in the corresponding (one) of the parameters or the errors in the parameters.

The magnetic flux instruction $\lambda 2d^*$ may be inputted to the skin effect correction circuit 17 in place of the detected value $\omega r$ of the rotor speed detection circuit 10 and/or the torque current IT may be inputted to the skin effect correction circuit 17 in place of the torque current instruction IT*.

It is noted that although the skin effect correction circuit 17 has the two-dimensional non-linear function with the torque current instruction IT* and the detected value of the rotor speed ωr as the input variables of the two lateral axes, a three-dimensional non-linear function table may be used with x-y cooditates set as the input variables IT* and ωr and z coordinate being the output variable of the skin effect correction circuit 17.

Figure 2:
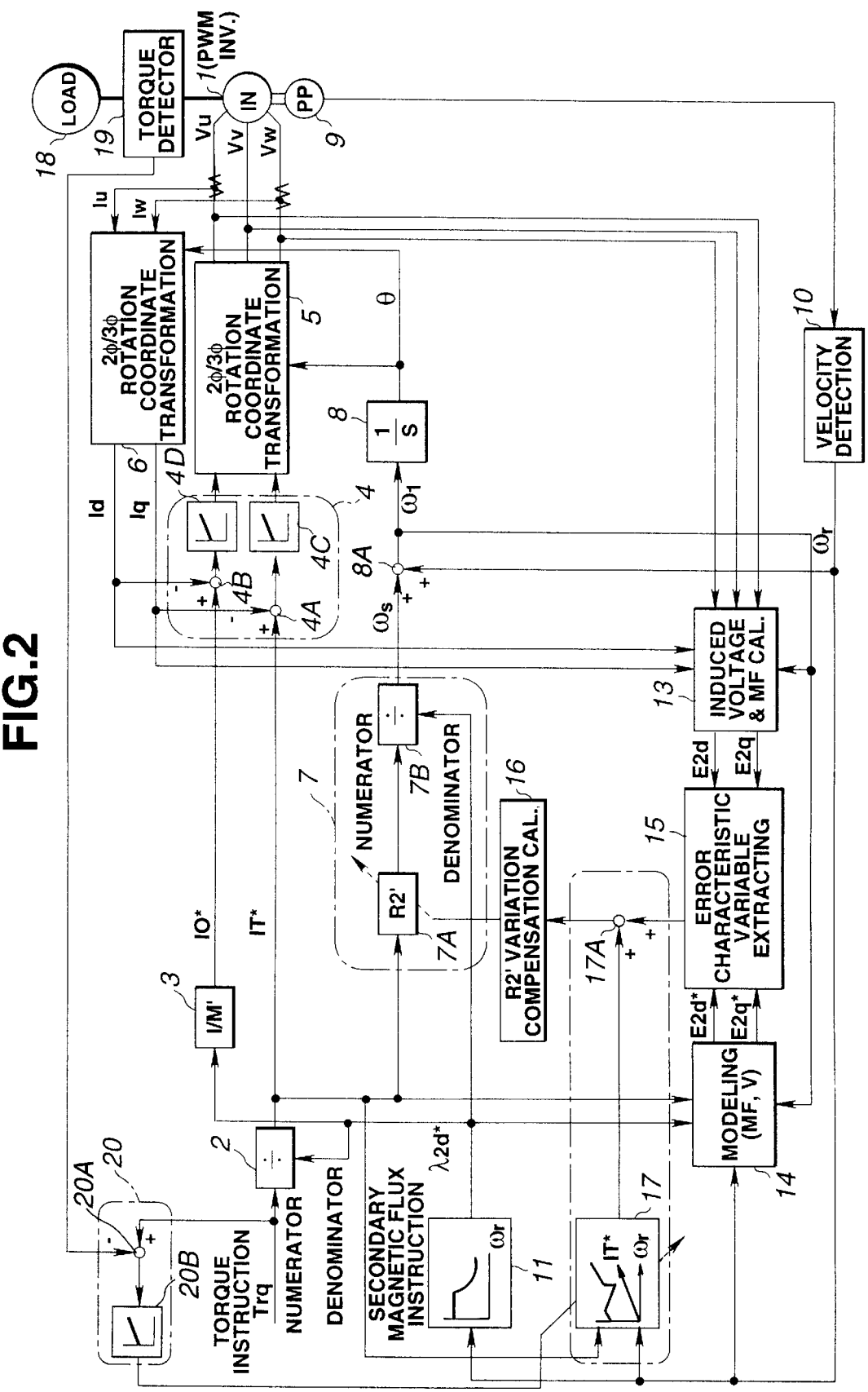
FIG. 2 is a circuit block diagram of the induction motor torque controlling apparatus in a second preferred embodiment according to the present invention.

(Second Embodiment) FIG. 2 shows a second preferred embodiment of the induction motor torque controlling apparatus according to the present invention.

In FIG. 2, an actual load is directly applied from a load facility 18 to the induction motor 1 to be controlled.

A torque detector 19 detects the load torque from the load facility 18.

In order to further improve the torque control accuracy, a torque control circuit 20 is added to the structure of the first preferred embodiment shown in FIG. 1 in which the torque instruction Trq is compared with the detected torque of the torque detector 19 at each detected speed of the rotor of the induction motor IM 1 and the output variable of the skin effect correction circuit 17 is further connected so that their values coincide with each other.

The skin effect correction circuit 17 updates and stores the output value of the torque control circuit 20 as the correction function value of the skin effect correction circuit 17. The torque control circuit 20 includes a subtractor 20A arranged for subtracting the detected torque of the torque detector 19 from the torque instruction value Trq and a function table 20B of the output variable of the skin effect correction circuit 17 with respect to a subtraction result of the subtractor 20A.

If the actual load torque is coincident with the torque instruction Trq, it can be said that the secondary resistance compensation has been converged into the accurate torque value. At the same time, the corrective data required for the coincidence of both of the detected torque value and the torque instruction value can be derived.

In this tuning operation of the second embodiment, the torque control circuit 20 has the function of measuring the torque during the tuning operation and saving the 19 torque or speed variation in a two-dimensional torque.

It is noted that when the induction motor 1 is applied to the actual situation such as the chassis dynamometer, the load facility 18 is replaced with the actual load facility.

(Third Embodiment)

A highly accurate torque control can be achieved in either the first or second embodiment for a steady state torque. However, when the torque is transiently and abruptly varied, a response delay in the secondary resistance compensation occurs with respect to the variation in the secondary resistance component and, thus, provides a cause of a torque disturbance. To solve this second problem described in the BACKGROUND OF THE INVENTION, a third preferred embodiment is proposed and reduced into practice.

FIG. 3 shows a third preferred embodiment of the torque controlling apparatus according to the present invention.

In FIG. 3, a skin effect transient component correction circuit 21 and a multiplier 22 are added to the circuit structure of the first embodiment shown in FIG. 1.

The skin effect transient component correction circuit 21 is added in order to compensate for a component corresponding to the variation in the secondary resistance due to the skin effect caused by the variation in the current flowing through the motor 1 in the same way as the skin effect correction circuit 17.

The skin effect transient component correction circuit 21 has a two-dimensional (or alternatively a three-dimensional) non-linear function table with the detected value ωr of the rotor speed and torque current 20 instruction IT* as inputted data. With the correction value for the secondary resistance under each of the various driving conditions (the combination of the speed (ωr) with the torque instruction (IT*)) previously stored in the correction circuit 22 as a multiplier for the multiplier 22, the multiplier 22 multiplies the output of the secondary resistance variation component calculating circuit 16 by the multiplier (correction value) described above.

Even if an influence of the skin effect is large and the current flowing through the motor 1 causes a remarkable change in the secondary resistance of the actual induction motor 1, the non-linear function in the skin effect transient component correction circuit 21 is quickly varied in response to the torque instruction Trq (or torque current instruction IT*) so that the secondary resistance $R_2'$ used to calculate the slip frequency is always made coincident with that of the actual induction motor 1. Hence, even if the torque instruction Trq is transiently and abruptly varied, the torque control with a high accuracy thereof can be achieved.

It is noted that although, in the third embodiment shown in FIG. 3, the circuits denoted by 21 and 22 are used in the case where the secondary resistance compensation circuit 16 is present, the output variable of the skin effect transient component compensation circuit 21 is directly multiplied to the secondary resistance component $R_2'$ of 7A in the slip calculator 7 to be corrected in a case where the secondary resistance compensation is not required since a temperature variation of the induction motor 1 is not easy to occur (such a case where the ambient temperature of the motor 1 is air conditioned to maintain a normal temperature so that a temperature rise is rare).

(Fourth Embodiment)

Figure 4:
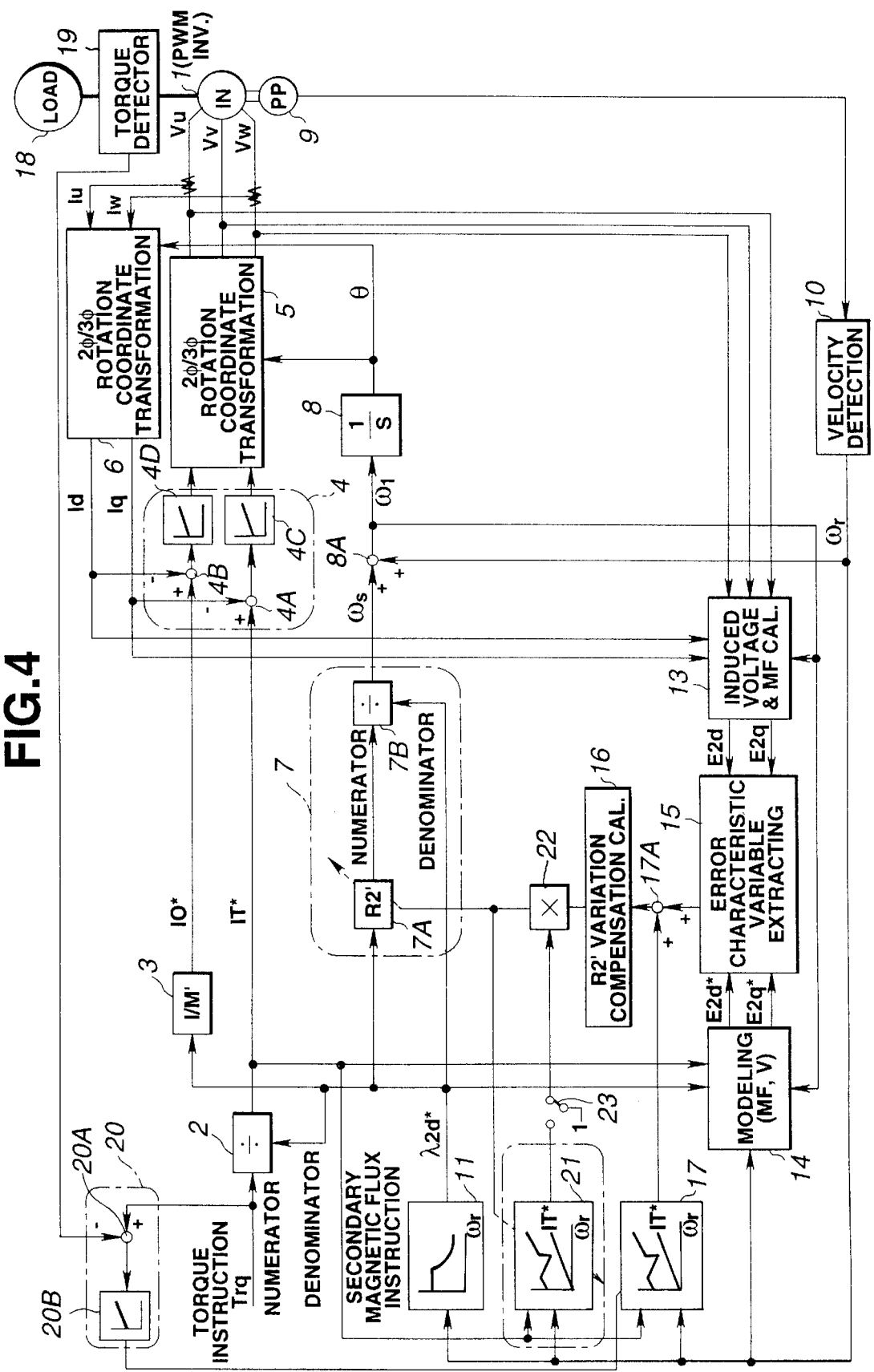
FIG. 4 is a circuit block diagram of the induction motor torque controlling apparatus in a fourth preferred embodiment according to the present invention.

FIG. 4 shows a fourth preferred embodiment of the induction motor (three-phase) torque controlling apparatus according to the present invention.

In FIG. 4, a switch 23 is interposed between the output end of the skin effect transient component correction circuit 21 and the multiplier 22 as described in the third embodiment.

The other structure than the switch 23, a gain (=1) circuit, the multiplier 22, and the skin effect transient component correction circuit 21 is the same as that in the second embodiment shown in FIG. 2.

When the tuning operation using the load facility 18 and the torque detector 19 is carried out, the switch 23 is turned to the gain (=1) multiplier so as to halt the function of the correction by the skin effect transient component correction circuit 21 so that the correction of the secondary resistance by means of the transient component correction circuit 21 is separated and the same operation as the second embodiment is carried out. At this time, the tuning of the correction function at a plurality of points is carried out in response to the detected value of the rotor speed and the torque instruction in the same case as the second embodiment. Then, when the torque instruction and load torque are coincident with each other, the value of KR2 which is the secondary resistance compensation output of the secondary resistance variation compensation circuit 16 is stored in the correction circuit 21 as the correction data.

During the actual driving, the switch 23 is turned to the output side of the skin effect transient component correction circuit 21 to be connected to the multiplier 22. Thus, the correction circuit 21 outputs the secondary resistance variation component corresponding to the skin effect component in the actual induction motor 1 after the tuning operation.

Consequently, if the temperature in the motor 1 is constant, the secondary resistance component output of the compensation circuit 16 is not varied even if the torque instruction is varied so that the compensation circuit 16 compensates only for the secondary resistance circuit component due to the variation in temperature.

In other words, the variation factors in the secondary resistance include the components according to the temperature and according to the skin effect due to the current flowing through the motor 1. When the tuning operation in the case of the fourth embodiment is applied to the third embodiment, the compensation circuit 16 side compensates only for the temperature variation and the correction circuit 21 side corrects only the component of the skin effect due to the torque current variation (exciting current variation). Namely, the correction circuits different for each kind of variation factors are prepared and installed. Hence, even during the occurrence in the abrupt variation in the torque instruction, the accurate torque control can be achieved.

It is noted that FIG. 6, the PWM inverter, the velocity detection circuit are exemplified by the U.S. Pat. No. 5,341,081 (the disclosure of which is herein incorporated by reference).

It is noted that although the circuit block diagram of FIGS. 1 to 4 is drawn in the hardware form, the circuits expect the motor 1 and its peripheral circuits (9, 10, 18, 19) may be constituted by a software which is stored in a control unit for the inverter.

What is claimed is:

1. An apparatus for controlling a torque of an induction motor through a vector control method type inverter, comprising:

a) a detector arranged for detecting a velocity $\omega r$ of a rotor of the induction motor;

b) an output frequency calculator arranged for calculating an output frequency $\omega_1$ of the induction motor from the detected rotor velocity $\omega r$;

c) a model calculator having a model equivalent to the induction motor and arranged for calculating at least a secondary induced voltage $E_2^*$ of the model from a torque current instruction $IT^*$, a secondary magnetic flux instruction $\lambda_{2d}^*$, and the output frequency $\omega_1$;

d) an induced voltage and magnetic flux calculator arranged for calculating at least a secondary induced voltage $E_2$ from a primary voltage and current of the induction motor;

e) an error characteristic variable extracting circuit arranged for deriving a deviation between the calculated secondary induced voltages by said induced voltage and magnetic flux calculator and said model calculator 9 and extracting and outputting an error characteristic variable corresponding to a variation in a secondary resistance of the induction motor from the deviation therebetween as a one-dimensional component;

f) a slip calculator arranged for calculating a slip frequency $\omega s$ from the secondary magnetic instruction $\lambda_{2d}^*$, the torque current instruction $IT^*$, and the secondary resistance $R_2'$ of the induction motor; and g) a compensation circuit arranged for correcting the slip frequency calculation of said slip calculator used to perform a vector control for the induction motor by a temperature variation in the secondary resistance of the induction motor according to an output variable of said error characteristic variable extracting circuit, wherein said apparatus further comprises a skin effect correction circuit having a non-linear function table and arranged for deriving an error component developed in an output of said compensation circuit when a leakage inductance of the induction motor is non-liearly varied due to a skin effect from the non-linear function table corresponding to the detected velocity $\omega r$ of the rotor of the induction motor and at least either of the torque current instruction $IT^*$ or torque instruction Trq and an adder arranged for adding the outputted error component of said skin effect correction circuit to the output variable of said error characteristic variable extracting circuit.

2. An apparatus for controlling a torque of an induction motor through a vector control method type inverter as claimed in claim 1, which further comprises: a load facility connected to the rotor of the induction motor; a torque detector arranged for detecting a load torque of the induction motor; and a torque control circuit arranged for comparing the detected load torque of the induction motor and the torque instruction Trq and correctively tuning the non-linear function table in said skin effect correction circuit so that the detected load torque of the induction motor coincides with the torque instruction Trq when the load torque is applied from the load facility to the induction motor.

3. An apparatus for controlling a torque of an induction motor through a vector control method type inverter as claimed in claim 1, which further comprises: a skin effect transient component correction circuit having another non-linear function table and arranged for deriving a variation component of the secondary resistance when the secondary resistance of the induction motor is non-linearly varied due to the skin effect from the other non-linear function table according to the detected velocity of the rotor $\omega r$ and at least either of the torque current instruction $IT^*$ or the torque instruction Trq; and a multiplier arranged for multiplying the output of said compensation circuit by a multiplier of an output of said skin effect transient component correction circuit.

4. An apparatus for controlling a torque of an induction motor through a vector control method type inverter as claimed in claim 3, which further comprises: a switch arranged for switching the output of said skin effect transient component correction circuit to a gain of 1; a load facility connected to the rotor of the induction motor; a torque detector arranged for detecting a load torque of the induction motor; and a torque control circuit arranged for comparing the detected load torque of the induction motor and the torque instruction Trq and correctively tuning the non-linear function table in said skin effect correction circuit so that the detected load torque of the induction motor coincides with the torque instruction Trq when the load torque is applied from the load facility to the induction motor and wherein the other non-linear function in the skin effect transient component correction circuit is tuned according to an output of said multiplier when the non-linear function table in the skin effect correction circuit is tuned according to an output of said torque control circuit.

5. An apparatus for controlling a torque of an induction motor through a vector control method type inverter as claimed in claim 4, wherein said non-linear function table in said skin effect correction circuit is a two-dimensional table having two lateral axes corresponding to the inputted detected velocity $\omega r$ of the rotor of the induction motor and to the inputted torque current instruction $IT^*$ and a longitudinal axis corresponding to the error component having the same unit as the output variable of the error characteristic variable extracting circuit.

6. An apparatus for controlling a torque of an induction motor through a vector control method type inverter as claimed in claim 5, wherein said output error component of the skin effect correction circuit is derived from the non-linear function table using an interpolation.

7. An apparatus for controlling a torque of an induction motor through a vector control method type inverter as claimed in claim 5, wherein said output error component of the skin effect correction circuit is derived from the non-linear function table using an approximation of the function.

8. An apparatus for controlling a torque of an induction motor through a vector control method type inverter as claimed in claim 5, wherein said non-linear function table in said skin effect correction circuit is a three-dimensional table having x-y coordinates corresponding to the detected velocity of the induction motor rotor ωr and the torque current instruction IT* and a z axis corresponding to the output error component of the skin effect correction circuit having the same unit as the output variable of the error characteristic variable extracting circuit.

9. An apparatus for controlling a torque of an induction motor through a vector control method type inverter as claimed in claim 8, wherein the output variable of the error characteristic variable extracting circuit is the secondary induced voltage deviation.

10. An apparatus for controlling a torque of an induction motor through a vector control method type inverter as claimed in claim 1, wherein said induced voltage and magnetic flux calculating circuit further calculates the secondary magnetic flux $\lambda_2$ $(\lambda_2 d, \lambda_2 q)$ as an integration of the secondary induced voltage $E_2$ and said model calculator further calculates the secondary magnetic flux $\lambda 2^*$ ($A_2 d^*$, $A_2 q^*$) from the detected rotor velocity ωr, the torque current instruction IT*, and the exciting current instruction I0*, and the output variable of said error characteristic variable extracting circuit is the secondary magnetic flux deviation.

11. An apparatus for controlling a torque of an induction motor through a vector control method type inverter as claimed in claim 4, wherein said switch is turned to connect an output end of the skin effect transient component correction circuit to the multiplier after the tuning operation of tuning the other non-linear function table in the skin effect transient component correction circuit.

12. An apparatus for controlling a torque of an induction motor through a vector control method type inverter as claimed in claim 11, wherein said torque control circuit includes a subtractor arranged for subtracting the torque instruction Trq from the load torque detected by the torque detector and a two-dimensional table arranged for deriving the output variable of the skin effect correction circuit according to a subtraction result by said subtractor through the table thereof.

13. A method for controlling a torque of an induction motor through a vector control method type inverter, said method comprising the steps of:

a) detecting a velocity ωr of a rotor of the induction motor;

b) calculating an output frequency $\omega_1$ of the induction motor from the detected rotor velocity ωr;

c) providing a model equivalent to the induction motor and calculating at least a secondary induced voltage $E_2^*$ of the model from a torque current instruction IT*, a secondary magnetic flux instruction $\lambda_{2d}^*$, and the output frequency $\omega_1$;

d) calculating at least a secondary induced voltage $E_2$ from a primary voltage and current of the induction motor;

e) deriving a deviation between the calculated secondary induced voltages at the step d) and step c) and extracting and outputting an error characteristic variable corresponding to a variation in a secondary resistance of the induction motor from the deviation therebetween as a one-dimensional component;

f) calculating a slip frequency ωs from the secondary magnetic instruction $\lambda_{2d}^*$, the torque current instruction IT*, and the secondary resistance $R_2'$ of the induction motor; and g) correcting the slip frequency calculation used to perform a vector control for the induction motor by a temperature variation in the secondary resistance of the induction motor according to an output variable at the step e), wherein said method further comprises the steps of: h) providing a non-linear function table; i) deriving an error component developed in an output of a compensation circuit when a leakage inductance of the induction motor is non-linearly varied due to a skin effect from the non-linear function table corresponding to the detected velocity CO r of the rotor of the induction motor and at least either of the torque current instruction IT* or torque instruction Trq; and J) adding the outputted error component to the output variable outputted at the step e).

* * * * *